(12) United States Patent
Sheets et al.

(10) Patent No.: US 9,889,529 B2
(45) Date of Patent: Feb. 13, 2018

(54) SYSTEM AND METHOD FOR PRELOADING TENSION IN A STUD USING AN ANTI-SEIZURE SPACER FOR TAPERED THREAD CONNECTIONS

(71) Applicant: Riverhawk Company, New Hartford, NY (US)

(72) Inventors: Robert Sheets, Barneveld, NY (US); Daniel Johnston, Sauquoit, NY (US)

(73) Assignee: Riverhawk Company, New Hartford, NY (US)

( * ) Notice: Subject to any disclaimer, the term of this patent is extended or adjusted under 35 U.S.C. 154(b) by 69 days.

(21) Appl. No.: 15/142,113

(22) Filed: Apr. 29, 2016

(65) Prior Publication Data

US 2016/0318139 A1    Nov. 3, 2016

Related U.S. Application Data

(60) Provisional application No. 62/155,760, filed on May 1, 2015.

(51) Int. Cl.
| | |
|---|---|
| *F16B 31/00* | (2006.01) |
| *B23P 19/06* | (2006.01) |
| *B25B 29/02* | (2006.01) |
| *F16B 31/04* | (2006.01) |

(52) U.S. Cl.
CPC ............ *B23P 19/067* (2013.01); *B25B 29/02* (2013.01); *F16B 31/00* (2013.01); *F16B 31/043* (2013.01)

(58) Field of Classification Search
CPC ...... F16B 13/0883; F16B 31/00; F16B 31/04; F16B 31/043; F16B 35/005; B23P 19/06; B23P 19/067; B25B 29/02

USPC .................................... 411/14.5, 16–17, 393
See application file for complete search history.

(56) References Cited

U.S. PATENT DOCUMENTS

| | | | |
|---|---|---|---|
| 2,518,468 | A | 8/1950 | Harding |
| 3,002,770 | A | 10/1961 | Chestnut et al. |
| 3,176,744 | A | 4/1965 | Brightman |
| 3,182,703 | A | 5/1965 | Smyth |
| 3,263,726 | A | 8/1966 | McKay |
| 3,437,541 | A | 4/1969 | Cooper et al. |
| 3,474,845 | A | 10/1969 | Podell |

(Continued)

FOREIGN PATENT DOCUMENTS

DE    102006048096A1   A1    4/2008

*Primary Examiner* — Roberta S Delisle
(74) *Attorney, Agent, or Firm* — Woods Oviatt Gilman LLP; Dennis B. Danella, Esq.

(57) ABSTRACT

A system for preloading tension in a stud using an anti-seizure spacer for tapered thread connections is provided. The system comprises a hydraulic tensioning device including a nut configured for threadably engaging the stud, a foot, a cylinder having a first bore defined therein and a surface for engaging the foot, and a piston movably positioned within the first bore, wherein a hydraulic cavity is defined therebetween. The device further includes a puller screw including male tapered threads configured for being threadably coupled with female tapered threads on the stud. The puller screw includes a head configured for engaging a surface of the piston. The system also includes a spacer positioned between the male tapered threads of the puller screw and the female tapered threads of the stud. A method for preloading tension in a stud using the spacer is also provided.

19 Claims, 4 Drawing Sheets

(56) References Cited

U.S. PATENT DOCUMENTS

| | | | |
|---|---|---|---|
| 3,478,800 A | | 11/1969 | Wallace |
| 3,488,666 A | | 1/1970 | Podell |
| 3,568,746 A | | 3/1971 | Faroni et al. |
| 3,653,675 A | | 4/1972 | Schaefer |
| 3,755,773 A | | 8/1973 | Johnson |
| 3,784,435 A | | 1/1974 | Bagheri et al. |
| 3,869,393 A | | 3/1975 | Booker |
| 4,182,215 A | * | 1/1980 | Green ................ F16B 31/04 411/434 |
| 4,246,810 A | * | 1/1981 | Keske ................ B25B 29/02 81/57.38 |
| 4,249,718 A | * | 2/1981 | Heaton ............... B25B 29/02 254/29 A |
| 4,569,506 A | * | 2/1986 | Vassalotti ........... F16B 31/043 254/29 A |
| 4,580,796 A | * | 4/1986 | Baur ................. B23B 31/204 279/4.02 |
| 4,927,307 A | | 5/1990 | Fitzgerald et al. |
| 5,046,906 A | * | 9/1991 | Bucknell ............. B23B 29/02 411/432 |
| 5,407,312 A | | 4/1995 | Terrizzi |
| 5,468,106 A | * | 11/1995 | Percival-Smith ...... B25B 29/02 277/649 |
| 5,527,015 A | * | 6/1996 | Percival-Smith ...... B23P 19/067 254/29 A |
| 6,048,151 A | | 4/2000 | Kwee |
| 7,513,178 B2 | * | 4/2009 | Hohmann ............ B25B 29/02 81/57.14 |
| 8,261,421 B2 | * | 9/2012 | Monville ............ B23P 19/067 29/407.01 |
| 8,266,781 B2 | * | 9/2012 | Bucknell ............ B23P 19/067 29/446 |
| 8,950,292 B2 | * | 2/2015 | Declerck ............ B23P 19/067 254/29 A |

\* cited by examiner

INTERFERENCE DUE TO DIFFERENTIAL STRAIN

SYSTEM AND METHOD FOR PRELOADING TENSION IN A STUD USING AN ANTI-SEIZURE SPACER FOR TAPERED THREAD CONNECTIONS

CROSS-REFERENCE TO RELATED APPLICATIONS

This application claims the benefit of U.S. patent application Ser. No. 62/155,760, filed on May 1, 2015, which is hereby incorporated by reference in its entirety.

FIELD OF THE INVENTION

The present invention generally relates to a system for preloading tension in a stud using an anti-seizure spacer for tapered thread connections; in particular, the present invention relates to a spacer positioned between tapered threads of a stud that is used to fasten one or more structural members together and tapered threads of a puller screw in a hydraulic tensioning device that is used to produce preload tension in the stud, wherein the spacer facilitates the removal of the puller screw from the stud after the stud is placed in tension. The present invention also relates to a method for using the anti-seizure spacer with a hydraulic tensioning device and stud.

BACKGROUND OF THE INVENTION

It is common for studs, bolts and rods (hereinafter "studs") to be used as a fastener to provide a secure mechanical connection between structural members, such as, for example, a pair of opposing flanges on a piece of machinery. By placing a preload tension force on the stud, a more secure connection may be created and the overall fastener life may be increased. The tensioning of a stud is typically accomplished by a tensioning system or device that applies an axially-directed force to the stud in a direction away from the structural member. The tensioning system generally includes a mechanism for gripping the stud and a load cell. An axially-directed force is applied by the load cell to the gripping mechanism. The gripping mechanism transfers the force to the stud, and thereby axially tensions or stretches the stud. The stud is then mechanically retained in its stretched or tensioned position by, for example, a nut that threadably engages external threads formed on the stud and which is tightened down to engage the flange.

Some conventional tensioning systems utilize mechanical load cells, whereas other tensioning systems use hydraulic load cells. Mechanical load cells convert mechanical pressure or force to the axial tensioning force, whereas hydraulic load cells convert hydraulic pressure to the axial tensioning force. Tensioning systems may be configured as either internal gripping, external gripping or integrated tensioning systems where the tensioner is integrated with the fastener.

Consistent with the description provided above, hydraulic tensioning systems typically include a hydraulic cylinder with a pulling feature, such as a puller screw, that attaches to the stud, and a reacting foot that presses against an exposed surface of the flange. An example of an existing hydraulic tensioning system can be seen in FIG. 1, which will be described in more detail below.

In some cases the best connection between a stud and a puller screw is a tapered thread. Tapered thread connections are particularly well suited to uniformly transferring axial load from one member to another. The tapered thread connection is often used when the desired fastener preload is high relative to the stud material strength, such as, 40% to 75% of yield strength. For example, a target preload stress of 60,000 psi may be used for a steel stud with a yield strength of 100,000 psi. A consequence of preloading a stud is that the stress in the stud due to preload results in a strain (i.e., stretch) of the stud material. That is, the preloaded stud is longer than the same stud in the free, unloaded, state. Since the preloaded stud is longer, the threads on the stud have a greater pitch when loaded compared to when the stud is in the free state.

An important factor with tapered thread engagements is that the clearance between the male and female threads can be controlled by adjustment of how far the male thread is screwed into the female. The outer limits of such a fit are a zero engagement and a full engagement. A zero engagement exists when the male thread is not inserted deep enough to contact the female thread. Such a joint cannot transmit load and must be avoided. A full engagement exists when the male thread is inserted into the female to the point of stop, wherein no clearance exists between the flanks of the thread pair. In this instance, there is no allowance for dimensional variation between the male and female threads. While this is the strongest engagement, it is also the least forgiving, as will be explained below.

Figure 2:
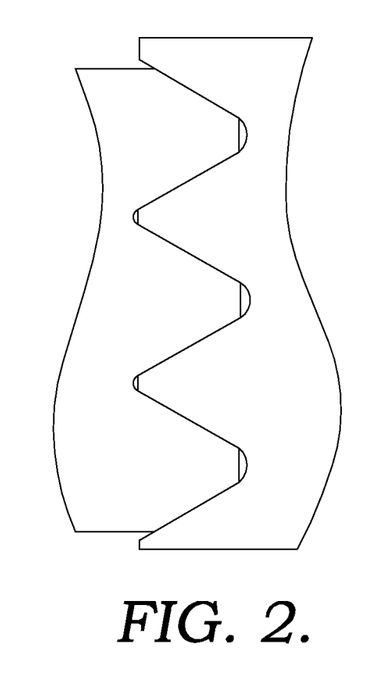
FIG. 2 is a partial enlarged view of tapered threads on the stud being threadably coupled with tapered threads on a puller screw of the hydraulic tensioning device, wherein both sets of threads are in a first normal (unloaded) state.
Figure 3:
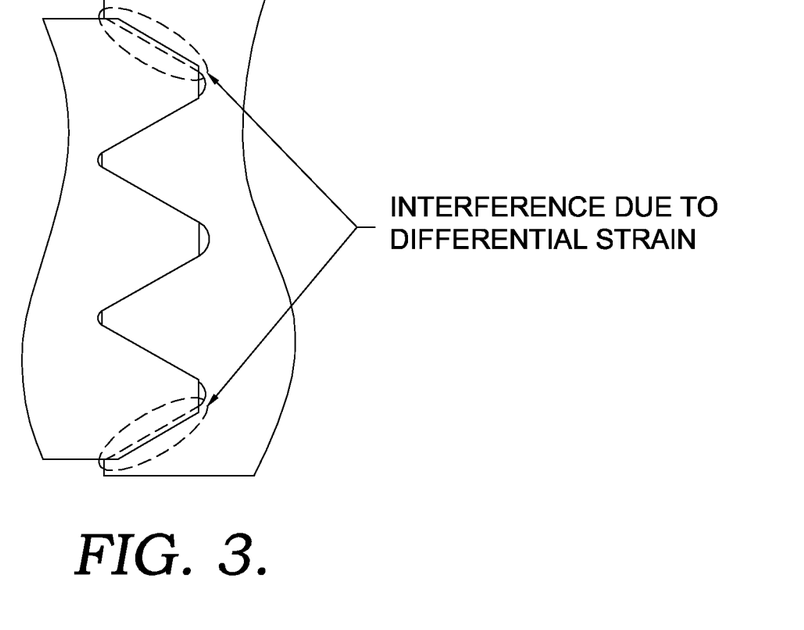
FIG. 3 is a partial enlarged view of the tapered threads on the stud and the puller screw in FIG. 2, except that the tapered threads on the stud are in a second strained (preloaded) state and the tapered threads on the puller screw are in the first normal (unloaded) state.

In practice, operators turn the puller screw in until resistance stops further engagement, as seen in FIG. 2. Once the puller screw is engaged, an axial tensioning load is applied to the puller screw and reacted against by the stud. This load produces a strain in both the puller screw and the stud. The joint is effective at transmitting load, and since no relative movement is required within the joint, there is no issue at this stage of the process. While the system is under hydraulic load, the operator turns a nut down in order to take up the distance that the stud has stretched. The hydraulic load is then released allowing the stud strain to produce preload into the stud. At this point, the stud is under tension and the puller screw in the free state. The female tapered thread of the stud is now stretched and the male tapered thread of the puller screw is relaxed back to its original length. The lack of initial clearance between the thread pair plus the strain differential between the components causes interference between the thread flanks, as seen in FIG. 3. The operator must unthread the puller screw from the stud in order to remove the hydraulic tensioning system and continue work, but typically has difficulty because of the high interference between the thread flanks. The result is that a high removal torque is required to undo the puller screw from the stud. For example, this torque could be 300 to 2,000 ft-lb for a 1.5" thread joint. This high resistance torque is a hindrance to effective tensioning operation leading to undesired costs of time and money.

In order to alleviate the need to use high removal torque to undo the puller screw from the stud, the thread engagement depth between the puller screw and the stud could be controlled by procedure, such that a net clearance exists between the thread flanks when tensioning starts then allowance for dimensional change can be achieved. However, insertion depth limits are hard for field personnel to control because the environment does not allow for accurate measurement of insertion depth. As such, this method has failed to produce reliable results in practice.

In another prior method, lubrication could be applied to the threads to reduce the frictional resistance when unthreading the puller screw from the stud. However, liquid lubrication tends to squeeze out from the contact areas thus producing no benefit, and dry lubrication can compact within the space between the threads leading to low joint strength. Compacting can be caused by either excessive quantity or repeated application for repeated joint work. As such, the lubrication method has also faded to produce reliable results.

Tight manufacturing tolerances of the male and female threads on the puller screw and stud could also be used, but the cost to reproduce parts to the required tolerances is cost prohibitive to implement.

Accordingly, there exists a need for an apparatus and method for reducing the amount of torque required to decouple the tapered threads of the puller screw and stud. The present invention fills these, as well as other, needs.

SUMMARY OF THE INVENTION

The present invention is directed to a system for preloading tension in a stud using an anti-seizure spacer for tapered thread connections. In general, the spacer may be positioned between tapered threads of a stud that is used to fasten one or more structural members together and tapered threads of a puller screw in a hydraulic tensioning device that is used to produce preload tension force in the stud, wherein the spacer facilitates the removal of the puller screw from the stud after the stud is placed in tension.

In particular, one aspect of the present invention is directed to a system for preloading tension in a stud including first and second ends and a central axis, wherein the stud is positioned within an aperture defined in a structural member. The first end of the stud may include a stop configured for engaging a first surface of the structural member, and the second end of the stud includes a first set of external threads and a second set of internal tapered threads. The system may comprise a hydraulic tensioning device and a spacer. The hydraulic tensioning device may include a nut, a foot, a cylinder, a piston, and a puller screw. The nut has a first set of internal threads configured for engaging the first set of external threads on the stud. The foot includes first and second ends, wherein the first end of the foot is configured for engaging a second surface of the structural member, and the second end of the foot extends in a direction away from the second surface of the structural member. The cylinder has a first bore defined therein, and includes a first surface for engaging the foot. The piston includes a second surface, and is movably positioned relative to the cylinder. A hydraulic cavity is defined between the piston and the cylinder. The puller screw is coupled with the piston, and includes first and second ends. The first end of the puller screw includes a first set of external tapered threads configured for being threadably coupled with the second set of internal tapered threads of the stud. The second end of the puller screw may include a head configured for engaging the second surface of the piston. The spacer is positioned between the first set of external tapered threads of the puller screw and the second set of internal tapered threads of the stud. Spacer may be approximately 0.0025 inches thick, lubricated or non-lubricated, and formed of polyethylene terephthalate (PET) polyester, linear processed high density polyethylene, unreinforced plastic, elastomer, paper, or any other organic or non-organic material so long as the material is rigid enough to resist being crushed under hand torque but capable of being crushed under tensioning forces.

In another aspect, the spacer may include a first surface and a second surface, wherein the first surface includes an adhesive disposed thereon, and wherein the first surface is disposed adjacent to one of the first set of external tapered threads of the puller screw or the second set of internal tapered threads of the stud. In another aspect, the spacer may include a semi-rigid material disposed on the first surface, and wherein the semi-rigid material is disposed adjacent to one of the first set of external tapered threads of the puller screw or the second set of internal tapered threads of the stud.

The spacer may also include a body portion and a handle portion. The body portion may be cylindrical shaped and be formed as either a string, wire, pre-extruded, or dawn material, for example. In the instance where the body portion is cylindrical shaped, the body portion may be formed of material, such as, but not limited to, copper, monofilament plastic, combinations thereof, or other types of material so long as the material is rigid enough to resist being crushed under hand torque but capable of being crushed under tensioning forces. The monofilament may be, for example, polyamide (nylon) alloy. The handle portion may be either a loop or a tab.

In yet another aspect, a method for preloading tension in the above-referenced stud is provided. The method comprises: a) providing a hydraulic tensioning device as previously described above; b) positioning the stud within an aperture defined in the structural member so that the first end of the stud is coupled with the structural member; c) threadably coupling the first set of internal threads of the nut with the first set of external threads on the stud; d) positioning a spacer adjacent to either the first set of external tapered threads of the puller screw and the second set of internal tapered threads of the stud; e) threadably coupling the first set of external tapered threads of the puller screw with the second set of internal tapered threads of the stud using, for example, approximately 5 to 30 ft-lb of torque, so that the spacer is positioned between the first set of external tapered threads of the puller screw and the second set of internal tapered threads of the stud, wherein the spacer provides a first gap between the first set of external tapered threads of the puller screw and the second set of internal tapered threads of the stud; f) introducing fluid within the hydraulic cavity so that the cylinder places the foot into engagement with the second surface of structural member, and so that the piston moves the puller screw away from the second surface of the structural member to apply a preload tension force of, for example, approximately 240,000 to 500,000 pounds for a stud with a diameter of 2.25 to 3.0 inches, on the stud along the central axis; g) engaging the nut with the second surface of the structural member to maintain the preload tension force on the stud; h) releasing at least a portion of the fluid within the hydraulic cavity; and i) decoupling the puller screw from the stud by unthreading the first set of external tapered threads of the puller screw from the second set of internal tapered threads of the stud using an amount of torque that is within the realm of human capability using a common 2 foot torque wrench, which may be up to about 100 ft-lb of torque.

The first gap provided by the spacer is reduced when the preload tension force is applied to the stud along the central axis due to the spacer being crushed by the preload tension force caused by the introduction of fluid within the hydraulic cavity. Further, the application of the preload tension force on the stud along the central axis causes a pitch of the tapered threads in both the first set of external tapered threads of the puller screw and the second set of internal tapered threads of the stud to change from a first normal unstrained (unloaded) state to a second strained (preloaded) state. Releasing the at least a portion of the fluid within the hydraulic cavity causes the pitch of the first set of external tapered threads of the puller screw to return to the first normal state. This creates differential pitch variation between the first set of external tapered threads of puller screw (unloaded state) and the second set of internal tapered threads of the stud. In the prior art, this differential pitch variation would cause the puller screw to seize relative to the stud, thereby making it difficult to remove the puller screw from the stud. The aforementioned crushing action of the spacer in the present invention causes the spacer to no longer fill the first gap between tapered threads. Therefore, when the load on the hydraulic tensioning device is released, a second gap (which is smaller than the first gap) remains that provides allowance for the dimensional change in the tapered threads of the stud caused by tensioning. As such, utilizing the spacer described above operates to avoid the interference between tapered threads of the puller screw and stud that is created due to tensioning and differential strain on the tapered threads.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of the this specification and are to be read in conjunction therewith, wherein like reference numerals are employed to indicate like parts in the various views, and wherein.

DETAILED DESCRIPTION OF THE INVENTION

Referring now to the drawings in detail, and specifically to FIGS. 1, 4A-E, 5, 6, reference numeral 10 designates a system for preloading tension in a stud 12 using a hydraulic tensioning device 14 and an anti-seizure spacer 16. In general, and as described in more detail below, spacer 16 is disposed in a tapered threaded joint 17 between stud 12 and hydraulic tensioning device 14 to provide a controlled gap and thereby prevent binding that otherwise occurs when the tapered thread joint is loaded in tension by hydraulic tensioning device 14, and subsequently released leaving only stud 12 under load.

Figure 1:
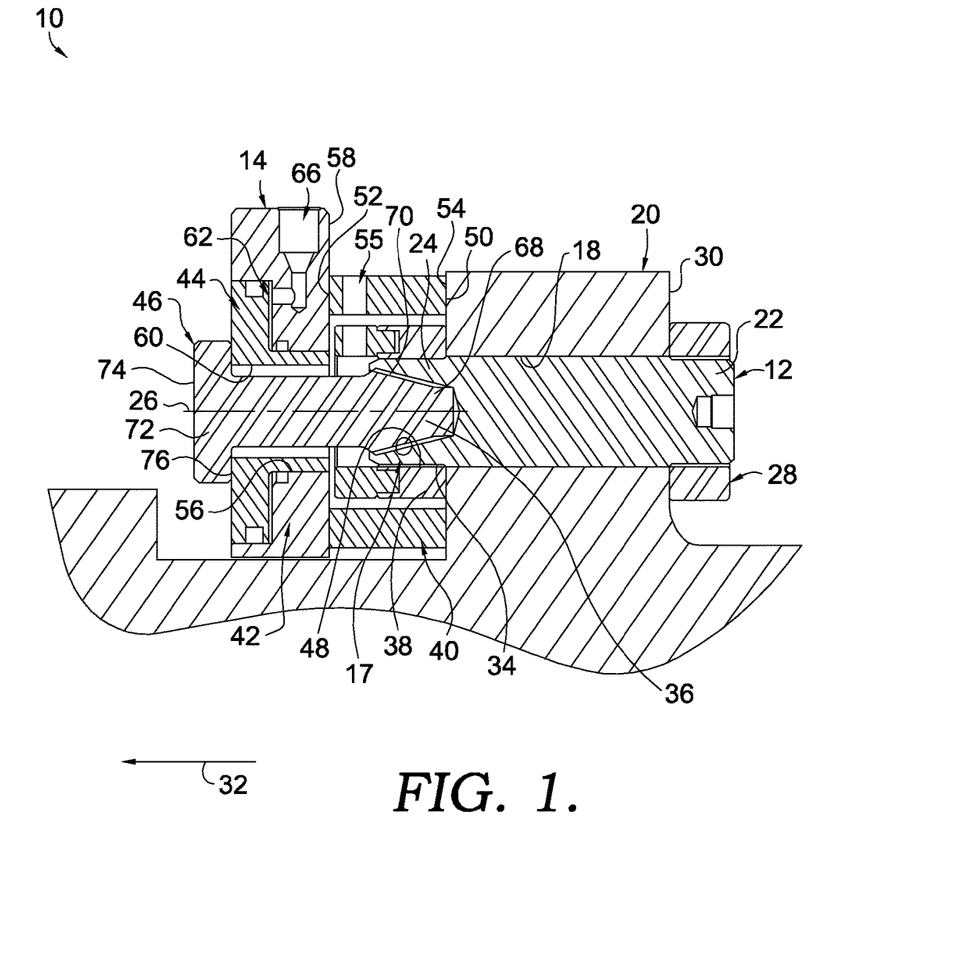
FIG. 1 is a cross-sectional view showing a hydraulic tensioning device coupled with a stud positioned within a structural member.

As best seen in FIG. 1, stud 12 is positioned within an aperture 18 defined in a structural member 20, such as, for example, one or more flanges, a frame, or the like. Stud 12 is used to fasten, secure, or hold together the one or more components that make up structural member 20. Stud 12 may have a first end 22, a second end 24, and a central longitudinal axis 26. First end 22 may include a stop 28 or any other configuration that is configured for engaging a first surface 30 of structural member 20 to limit the axial travel of stud 12 within aperture 18 in a loading direction 32. Stop 28 could take the form of a nut threadably coupled with first end 22 of stud 12, or a head integrally formed to first end 22, for example. Second end 24 of stud 12 includes a first set of external (male) threads 34 formed on an outer surface of stud 12, and a second set of internal (female) tapered threads 36 (FIGS. 5 and 6) formed within a receiving bore. Second set of internal tapered threads 36 are configured for interacting with hydraulic tensioning device 14 to impose a preload tension force on stud 12.

Figure 5:
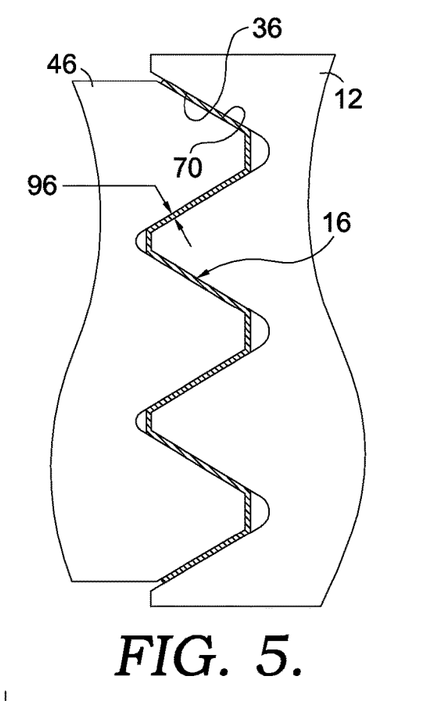
FIG. 5 is a partial enlarged view of a spacer positioned between the tapered threads on the stud and the tapered threads on a puller screw of the hydraulic tensioning device in a first normal (unloaded) state.
Figure 6:
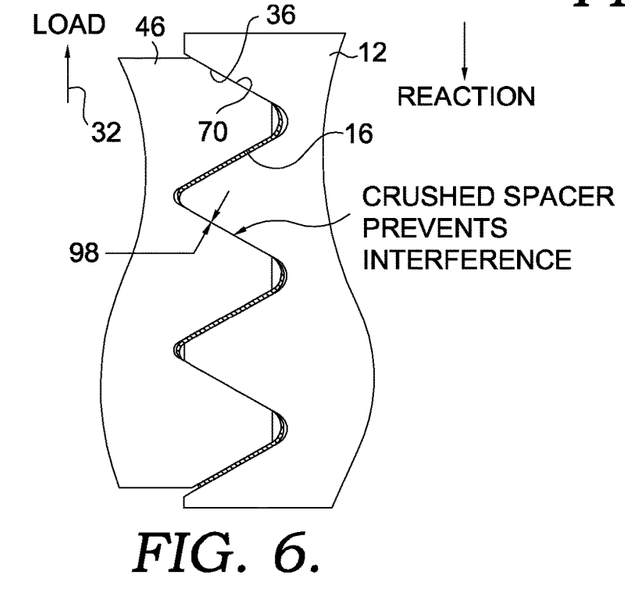
FIG. 6 is partial enlarged view of a spacer positioned between the tapered threads on the stud in a second strained (preloaded) state and the tapered threads on a puller screw of the hydraulic tensioning device in an unstrained state.

As best seen in FIG. 1, hydraulic tensioning device 14 may include a nut 38, at least one foot 40, a cylinder 42, a piston 44, and a puller screw 46. Nut 38 has a first set of internal threads 48 configured for engaging first set of external threads 34 on stud 12. Nut 38 may also include other configurations so long as it is used to maintain stud 12 in tension after the other components of hydraulic tensioning device 14 is used to preload stud 12. It should be understood that nut 38 may be a single piece component, or made up of multiple pieces as shown in FIG. 1. The at least one foot 40 may include a first end 50 and a second end 52, wherein first end 50 is configured for engaging a second surface 54 of structural member 20, and wherein second end 52 extends in a direction away from second surface 54. Foot 40 may further include an access port 55 defined therein that is configured for providing access to nut 38 to allow nut 38 to be tightened in order to maintain preload tension on stud 12. Cylinder 42 may have a bore 56 defined therein and includes a first surface 58 configured for engaging foot 40. Piston 44 is movably positioned relative to cylinder 42 and may have a bore 60 defined therein. For example, a portion of piston 44 may be positioned within bore 56 of cylinder 42 to guide the movement of piston 44 relative to cylinder 42. Further, a hydraulic cavity 62 is defined between cylinder 42 and piston 44 and is in fluid communication with a hydraulic port 66 defined in cylinder 42. Hydraulic port 66 allows a fluid to be introduced into hydraulic cavity 62 thereby causing piston 44 to move in the loading direction 32 relative to cylinder 42. Upon such movement of piston 44, piston 44 also operates to move puller screw 46 in loading direction 32. Puller screw 46 may be disposed within bore 60 of piston 44 and through nut 38 so that it can interact with stud 12. In particular, a first end 68 of puller screw 46 includes a first set of external (male) tapered threads 70 configured for being threadably coupled with second set of internal tapered threads 36 of stud 12 (FIGS. 5 and 6). Further, a second end 72 of puller screw 46 is coupled with piston 44 so that piston 44 moves puller screw 46 in loading direction 32. For example, puller screw 46 may include a head 74 configured for engaging a surface 76 of piston 44.

Figure 4A:
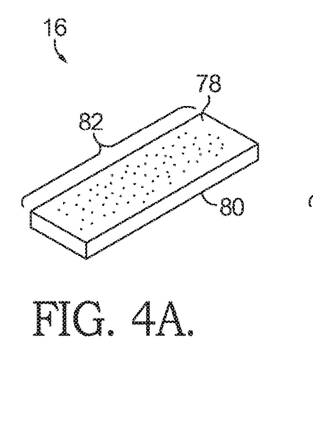
FIG. 4A is a perspective view of one embodiment of a spacer that may be used in the in accordance with the present invention.

In accordance with an aspect of the invention, and as best seen in FIG. 4A, system 10 further includes spacer 16 that is configured for being positioned between first set of external tapered threads 70 of puller screw 46 and second set of internal tapered threads 36 of stud 12. Spacer 16 provides a controlled gap in the tapered thread joint between puller screw 38 and stud 12 to prevent binding that otherwise occurs when the tapered thread joint is loaded in tension by hydraulic tensioning device 14, and subsequently released leaving only stud 12 under load.

Spacer 16 may be a sacrificial component that is formed of a moderately strong material, such as, for example, polyethylene terephthalate (PET) polyester, linear processed high density polyethylene, unreinforced plastic, elastomer, paper, or any other organic or non-organic material so long as the material is rigid enough to resist being crushed under torque that can be imposed by a hand of an operator, but capable of being crushed under tensioning forces of the magnitudes described herein. For example, spacer may be approximately 0.375 inches wide, 1 inch long, and 0.0025 inches thick. These exemplary dimensions provide a manageable size for the operator to handle spacer 16 with fingers, and when inserted between the tapered threads of puller screw 38 and stud 12, spacer 16 provides a controlled gap between threads 36, 70 that provides adequate clearance to allow for dimensional changes in threads 36, 70 due to tensioning. It should be understood that spacer 16 may be either lubricated or non-lubricated. It should be understood that spacer 16 is not limited to the exemplary dimensions mentioned above.

As best seen in FIG. 4A, spacer 16 may comprise a planar, sheet-like member including a first surface 78 and a second surface 80. First surface 78 may optionally include an adhesive layer 82 disposed thereon. Adhesive layer 82 may be, for example, a removable or re-stickable adhesive such as, but not limited to, rubber cement or an acrylic material. First surface 78, including adhesive layer 82, is disposed adjacent to one of first set of external tapered threads 70 of the puller screw 46 or second set of internal tapered threads 36 of stud 12 to help maintain the positioning of spacer 16 when hydraulic tensioning device 14 is coupled with stud 12.

Figure 4B:
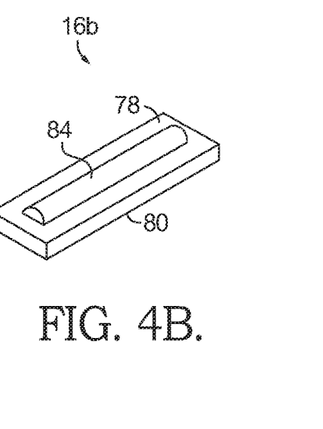
FIG. 4B is a perspective view of another embodiment of a spacer that may be used in the in accordance with the present invention.

In another aspect, as best seen in FIG. 4B, spacer 16b may include a semi-rigid material 84 disposed on at least a portion of first surface 78 in order to better control the gap between first set of external tapered threads of the puller screw 70 and second set of internal tapered threads 36 of stud 12. Semi-rigid material 84 may be used when the thickness between first and second surfaces 78, 80 is not large enough to meet a predefined gap requirement, for example, when larger tapered thread engagements are present for 3.5" or larger studs. In particular, semi-rigid material 84 is disposed adjacent to one of first set of external tapered threads 70 of puller screw 46 or second set of internal tapered threads 36 of stud 12. Semi-rigid material 84 may be formed in a semi-cylindrical shape, rectangular shape, comb shape, or other shape on first surface 78 of spacer 16b. The semi-rigid material 84 may be formed of a material, such as, but not limited to, polymer based filler materials which are inhibited from polymerization until they are dispensed. In cases where the stiffness of semi-rigid material needs to be controlled and the shape of the material is formed by injection into a mold, thermoplastic pellets or powder may be used to form semi-rigid material 84.

Figure 4C:
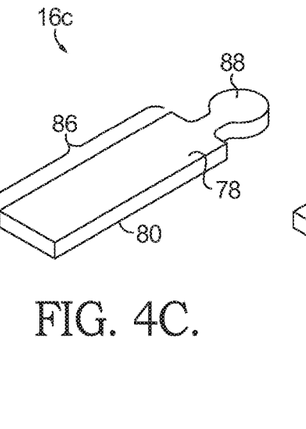
FIG. 4C is a perspective view of yet another embodiment of a spacer that may be used in the in accordance with the present invention.

In yet another aspect, as best seen in FIG. 4C, spacer 16c may include a body portion 86 and a handle portion 88. Body portion 86 of spacer 16 is configured for being disposed between first set of external tapered threads 70 of the puller screw 46 and second set of internal tapered threads 36 of stud 12. Handle portion 88 is configured to allow an operator to grip spacer 16 better when spacer 16 is being positioned between tapered threads 36, 70. It should be understood that handle portion 88 may or may not be formed of the same material as body portion 86. Handle portion 88 may be formed of any material that will allow an operator to properly position spacer 16.

Figure 4D:
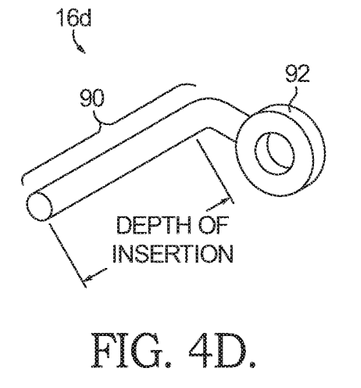
FIG. 4D is a perspective view of yet another embodiment of a spacer that may be used in the in accordance with the present invention.
Figure 4E:
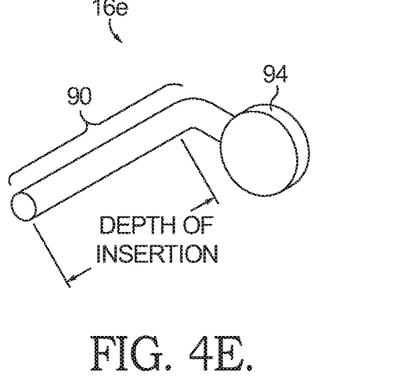
FIG. 4E is a perspective view of yet another embodiment of a spacer that may be used in the in accordance with the present invention.

In another aspect of the invention, with reference to FIG. 4D, spacer 16d may include a cylindrical body portion 90 and a handle portion 92. Cylindrical body portion 90 may be for example, a string, wire, pre-extruded or drawn material, that is formed of, for example, copper, monofilament plastic, combinations thereof, or other types of material so long as the material is rigid enough to resist being crushed under hand torque but capable of being crushed under tensioning forces of the magnitude described herein. The monofilament may be, for example, polyamide (nylon) alloy. Handle portion 92 may be integrally formed with body portion 90 in a loop shape, or may have a separate loop member affixed to body portion 90. Handle portion 92 may be positioned outside the joint between tapered threads 36, 70. The embodiment of spacer 16e shown in FIG. 4E is similar to spacer 16d, except that a handle portion 94 is a planar tab that may be integrally formed with body portion 90, and positioned outside the joint between tapered threads 36, 70.

It should be understood that each of the features described above with respect to FIGS. 4A-4E may be interchanged with each other, and still fall within the scope of the present invention.

Another aspect of the present invention is directed to a method for preloading tension in stud 12 positioned within aperture 18 defined in structural member 20 using hydraulic tensioning device 14 as previously described. The stud 12 is positioned within aperture 18 so that first end 22 is coupled with structural member 20. For example, stop 28 may be positioned adjacent to first surface 30 of structural member 20. The first set of internal threads 48 of nut 38 are then threadably coupled with first set of external threads 34 on stud 12. Nut 38 may or may not be threaded on stud 12 so that nut 38 is engaged with second surface 54 of structural member 20, but preferably nut 38 is engaged with second surface 54 to keep stud 12 in a relatively stable position within aperture 18.

Next, spacer 16 is positioned adjacent to either first set of external tapered threads 70 of puller screw 46 and second set of internal tapered threads 36 of stud 12. Optionally, adhesive layer 82 on spacer 16 may be used to assist with maintaining the position of spacer 16. The first set of external tapered threads 70 of puller screw 46 is then threadably coupled with second set of internal tapered threads 36 of stud 12 so that spacer 16 is positioned between first set of external tapered threads 70 and second set of internal tapered threads 36. The tapered threads 70 may be threadably coupled to tapered threads 36 using normal human capability, which may be approximately 5 to 30 ft-lb of torque. As best seen in FIG. 5, spacer 16 operates to provide a gap 96 between first set of external tapered threads 70 and second set of internal tapered threads 36. While the position of spacer 16 may change slightly when tapered threads 36, 70 are threaded together, as long as most of spacer 16 remains positioned between tapered threads 36, 70, spacer 16 will operate to provide gap 96. The spacer 16 material is compliant in bending so that spacer 16 generally takes on the shape of threads 36, 70. Spacer 16 is stiff in the thickness direction so that human applied torque does not crush spacer 16 and gap 96 is maintained.

The method further includes introducing fluid through hydraulic port 66 into hydraulic cavity 64 to apply a preload tension force on stud 12. In particular, as fluid is introduced into hydraulic cavity 64, first surface 58 of cylinder 42 is placed in contact with foot 40, which causes foot 40 to be placed into engagement with second surface 54 of structural member 20. Further, the introduction of fluid into hydraulic cavity 64 causes piston 44 to move in loading direction 32. Given that puller screw 46 is coupled with piston 44 (for example, by head 74 resting against surface 76), puller screw 46 also moves in direction 32 away from second surface 54 of structural member 20, which results in the application of a preload tension force on stud 12 along central axis 26. For example, the preload tension force on stud 12 may be approximately 240,000-500,000 pounds for studs that have a diameter between about 2.25 to 3.0 inches. The present invention also applies to other high tension loads that can be imposed by other sized studs. As the preload tension force is applied to stud 12, the material that spacer 16 is formed of is not capable of supporting the force imposed by hydraulic tensioning device 14, so spacer 16 is crushed as seen in FIG. 6. The application of the preload tension force on stud 12 causes the pitch of both first set of external tapered threads 70 of puller screw 46 and second set of internal tapered threads 36 of stud 12 to change from a first normal (unloaded) state to a second strained (loaded) state. For example, a 2.5 inch diameter steel stud with a 10 pitch thread engagement, loaded to 294,400 pounds (60,000 psi equivalent stress), the female thread stretches 0.0002 inches per thread.

After the preload tension force is applied to stud 12, nut 38 is engaged with second surface 54 of structural member 20 to maintain the preload tension force on stud 12. Nut 38 may be accessed through access port 55 in order to place nut 38 in engagement with second surface 54. Once nut 38 is in engagement with second surface 54 to maintain the preload tension force on stud 12, at least a portion of the fluid contained within hydraulic cavity 62 is released through hydraulic port 66, which in turn causes the pitch of first set of external tapered threads 70 of puller screw 46 to return to the first normal (unloaded) state. This creates differential pitch variation between first set of external tapered threads 70 of puller screw 46 (unloaded state) and second set of internal tapered threads 36 of stud 12 (loaded state). In the prior art, this differential pitch variation would cause the puller screw to seize relative to the stud, thereby making it difficult to remove the puller screw from the stud. The aforementioned crushing action of spacer 16 in the present invention causes spacer 16 to no longer fill gap 96 between tapered threads 36, 70. Therefore, when the load on hydraulic tensioning device 14 is released, a gap 98 (which is smaller than gap 96) remains that provides allowance for the dimensional change in tapered threads 36 caused by tensioning. As such, utilizing spacer 16 operates to avoid the interference (i.e., seizure) between tapered threads 36, 70 that is created due to tensioning and differential strain on the tapered threads. Puller screw 46 can now be decoupled from stud 12 by unthreading first set of external tapered threads 70 of puller screw 46 from second set of internal tapered threads 36 of stud 12. The tapered threads 70 may be threadably decoupled from tapered threads 36 using an amount of torque that is within the realm of human capability using a common 2 foot torque wrench, which may be up to about 100 ft-lb of torque. It should be understood that spacer 16, whether including adhesive layer 82 or not, may be formed of a material that will not form a permanent bond with either of tapered threads 36, 70 so that puller screw 46 may be decoupled with stud 12 after the preload tension force is applied to stud 12.

By utilizing a spacer, as described above, in conjunction with hydraulic tensioning device 14, at least some of the aforementioned problems and shortcomings that exist with respect to the prior art are addressed. In particular, the use of a low cost, replaceable spacer allows an operator to use a hydraulic tensioning device to apply a preload tension force on a stud, while preventing the seizure of the threads on the puller screw and stud, allowing for easy removal of the hydraulic tensioning device after such preload tension force is applied without having to use tools or lubricants that increase the time and expense of such a process. An operator can now remove a puller screw using normal human torque levels.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The invention claimed is:

1. A system for preloading tension in a stud including first and second ends and a central axis, wherein the stud is positioned within an aperture defined in a structural member, wherein the first end of the stud is configured for engaging the structural member, and wherein the second end of the stud includes a first set of external threads and a second set of internal tapered threads, the system comprising:
   a) a hydraulic tensioning device including:
      i) a nut having a first set of internal threads configured for engaging the first set of external threads on the stud;
      ii) a foot including first and second ends, the first end of the foot configured for engaging a second surface of the structural member, and the second end of the foot extending in a direction away from the second surface of the structural member;
      iii) a cylinder having a first bore defined therein, the cylinder including a first surface for engaging the foot;
      iv) a piston movably positioned relative to the cylinder, wherein a hydraulic cavity is defined between the piston and the cylinder;
      v) a puller screw including first and second ends, the first end of the puller screw including a first set of external tapered threads configured for being threadably coupled with the second set of internal tapered threads of the stud, the second end of the puller screw coupled with the piston; and
   b) a spacer positioned between the first set of external tapered threads of the puller screw and the second set of internal tapered threads of the stud.

2. A system in accordance with claim 1, wherein the spacer includes a first surface and a second surface, wherein the first surface includes an adhesive disposed thereon, and wherein the first surface is disposed adjacent to one of the first set of external tapered threads of the puller screw or the second set of internal tapered threads of the stud.

3. A system in accordance with claim 1, wherein the spacer includes a first surface and a second surface, wherein a semi-rigid material is included on the first surface, and wherein the semi-rigid material is disposed adjacent to one of the first set of external tapered threads of the puller screw or the second set of internal tapered threads of the stud.

4. A system in accordance with claim 1, wherein the spacer includes a body portion and a handle portion.

5. A system in accordance with claim 4, wherein the body portion is cylindrical shaped.

6. A system in accordance with claim 5, wherein the body portion is one of a string and a wire.

7. A system in accordance with claim 5, wherein the body portion is formed of copper, monofilament plastic, or combinations thereof.

8. A system in accordance with claim 4, wherein the handle portion is one of a loop or a tab.

9. A system in accordance with claim 1, wherein the spacer is formed of polyethylene terephthalate (PET) polyester, linear processed high density polyethylene, unreinforced plastic, elastomer, paper, or combinations thereof.

10. A system in accordance with claim 1, wherein the spacer is approximately 0.0025 inches thick.

11. A system in accordance with claim 1, wherein the spacer is non-lubricated.

12. A system in accordance with claim 1, wherein the first end of the stud includes a stop, wherein the stop is coupled to the first end of the stud.

13. A system in accordance with claim 1, wherein the piston includes a second surface, wherein the puller screw includes a head, and wherein the puller screw is coupled with the piston by engaging the head of the puller screw with the second surface of the piston.

14. A system in accordance with claim 1, wherein the cylinder includes a hydraulic port defined therein, and wherein the hydraulic port is in fluid communication with the hydraulic cavity.

15. A system in accordance with claim 1, wherein the foot includes an access port defined therein, and wherein the access port is configured for providing access to the nut.

16. A system in accordance with claim 1, wherein the spacer is formed of a material that is configured to be crushed.

17. A system in accordance with claim 1, wherein the spacer is formed of a material that is configured to be crushed when a preload tension force is imposed on the stud.

18. A system in accordance with claim 17, wherein the preload tension force is imposed on the stud when fluid is introduced into the hydraulic cavity thereby moving the puller screw and the piston relative to the cylinder.

19. A system in accordance with claim 17, wherein the stud includes a diameter between about 2.25 inches to 3.0 inches, and wherein the preload tension force is about 240,000 pounds to 500,000 pounds.

* * * * *